United States Patent [19]

Dodge, Jr.

[11] Patent Number: 4,502,668
[45] Date of Patent: Mar. 5, 1985

[54] REMOVABLE DOUBLE-ACTION ROPE GRIP

[76] Inventor: Cleveland E. Dodge, Jr., R.D. 1-7, Pownal, Vt. 05261

[21] Appl. No.: 501,623

[22] Filed: Jun. 6, 1983

[51] Int. Cl.³ ............... A47L 3/04; A62B 1/16; B65H 59/16
[52] U.S. Cl. ................... 254/391; 254/408; 254/415; 182/5; 182/192; 188/65.1
[58] Field of Search ............. 254/391, 402, 408, 409, 254/413, 415, 417; 242/107.2; 182/5, 6, 7, 192; 188/65.1

[56] References Cited

U.S. PATENT DOCUMENTS

| | | | |
|---|---|---|---|
| 2,148,590 | 2/1939 | Tamarin | 188/65.1 |
| 3,317,971 | 5/1967 | Meyer | 182/5 X |
| 3,852,943 | 12/1974 | Healy | 182/5 X |
| 3,876,036 | 4/1975 | Sweet | 182/192 X |
| 4,180,118 | 12/1979 | Vecchiarelli | 188/65.1 X |
| 4,253,218 | 3/1981 | Gibbs | 188/65.1 X |

FOREIGN PATENT DOCUMENTS

| | | | |
|---|---|---|---|
| 68485 | 1/1949 | Denmark | 254/391 |
| 1373066 | 8/1964 | France | 188/65.1 |
| 600900 | 6/1978 | Switzerland | 242/107.2 |
| 1077068 | 7/1967 | United Kingdom | |

*Primary Examiner*—Billy S. Taylor
*Assistant Examiner*—Joseph J. Hail, III
*Attorney, Agent, or Firm*—Handal & Morofsky

[57] ABSTRACT

A rope grip which comprises a guide means and operator means defining a channel for receiving a rope. The guide means defining a first gripping surface and the operator means defines a second gripping surface. The two surfaces are in a facing spaced relationship. Between these two surfaces a restricting means is disposed. The restricting means is springingly connected to an operating arm which influences its position. The extremities of the gripping surfaces are at different distances from one another, which causes a rope of appropriate size to become jammed between a gripping surface and the restricting means, depending upon the position of the restricting means.

19 Claims, 8 Drawing Figures

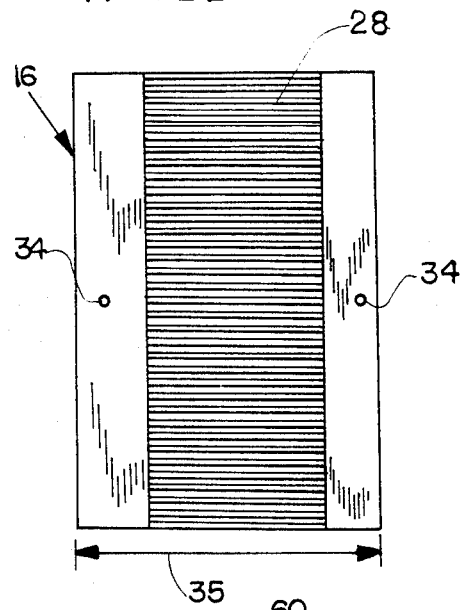
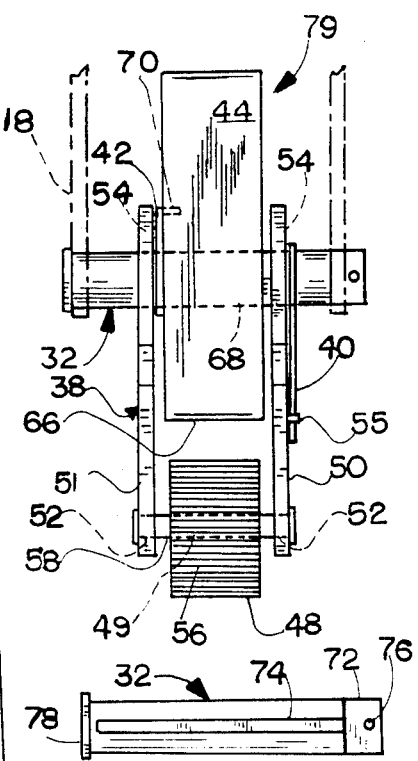
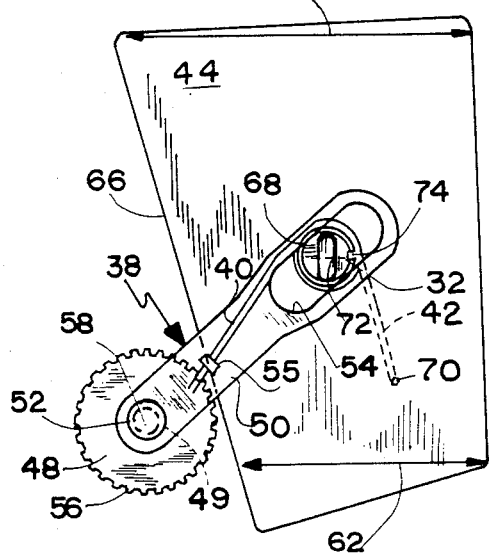
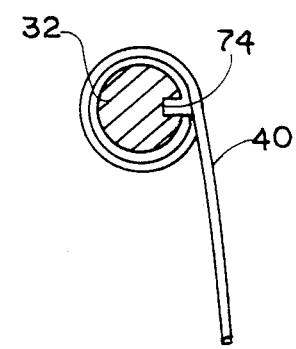

REMOVABLE DOUBLE-ACTION ROPE GRIP

TECHNICAL FIELD

The invention relates to a rope grip for protecting workmen at high altitudes from falling to the ground.

BACKGROUND ART

In the past, much effort has been devoted to the development of fall prevention devices known as rope grips. The desirable qualities of such a device fall into several catagories, including, safety, reliability, versatility, and convenience of use.

Dodge Machine Co., Inc. currently offers a rope grip with a number of desirable qualities, for example the rope grip is manufactured from large simple pieces of material which distribute the impact of a fall through relatively massive pieces of metal providing for strength, reliability, and safety. It can be attached to a person by means of a lanyard so that it can be moved up and down the rope without the person having to place his hand on the grip, which makes the rope grip convenient to use. This rope grip can be placed over a rope anywhere along the length of a rope, providing for further convenience. This rope grip is versatile, it can be used with ropes having a variation in diameter of as much as a quarter of an inch.

Another commercially available rope grip is the Barrow Hepburn Everest Rope Grip, patented in the U.K. with U.K. Pat. No. 1,077,068. This rope grip operates by means of three small steel balls through which the rope is passed. When the grip begins to fall rapidly down a rope, the friction of the rope against the balls draws them into a conical shaped housing which jams the rope between the three balls. While this device offers advantages over many others in terms of fail-safe operation, it too has practical drawbacks. This device can only be used with a very narrow tolerance in rope diameter. The device lacks versatility. The rope must be threaded through the rope grip as it cannot be opened for placing the grip on the rope, nor can it be opened for cleaning. It is not possible to move this grip past a splice or a knot on the rope. Thus, this rope grip is in many ways inconvenient to use. A safety device such as this one, which is inconvenient to use does not provide maximum effectiveness since it is likely that a person engaged in an activity where a rope grip should be used will not use a device which interferes with the activity, as this rope grip can.

The available rope grips, such as those noted above, provide varying degrees of fail-safe operation. This feature however, is gained at the expense of versatility and convenience. In accordance with the present invention, these and other disadvantages of the prior art are minimized. The present invention provides a high degree of fail-safe operation while remaining versatile and convenient to use.

DISCLOSURE OF INVENTION

The inventive rope grip comprises two gripping surfaces defining a channel for receiving a rope, a restricting means disposed in between them, and an operating arm to influence the position of the restricting means.

The gripping surfaces of the inventive rope grip are in a spaced facing relationship to one another. One extremity of one of the first gripping surfaces is closer to the other gripping surface than to the other extremity of the first gripping surface. This provides a channel of variable cross-section. The restricting means restricts the open cross-sectional area of this channel. Depending upon the size of the rope and the position of the restricting means a rope may be jammed against a gripping surface and the restricting means, arresting the movement of the rope grip along the rope.

As illustrated below, the inventive rope grip offers many advantages over available rope grips. It can be made from a plurality of parts so that it can be easily disassembled, or opened to be put around a rope.

In general, the flexible methods by which the inventive rope grip can be produced make it amenable to design for a particular application, presenting desirable qualities and eliminating others.

BRIEF DESCRIPTION OF DRAWINGS

These and other aspects of the invention are described below in conjunction with the drawings which illustrate two embodiments of the invention in which:

FIG. 2 is a detail of a removable part thereof which allows the grip to be engaged without threading;

FIG. 4 is a detail of internal parts of the inventive grip;

FIG. 5 is another detail of internal parts of the inventive grip;

FIG. 6 is a detail of a pin used in the inventive grip;

FIG. 7 is a detail of a spring used in the inventive grip; and

BEST MODE FOR CARRYING OUT THE INVENTION

Figure 1:
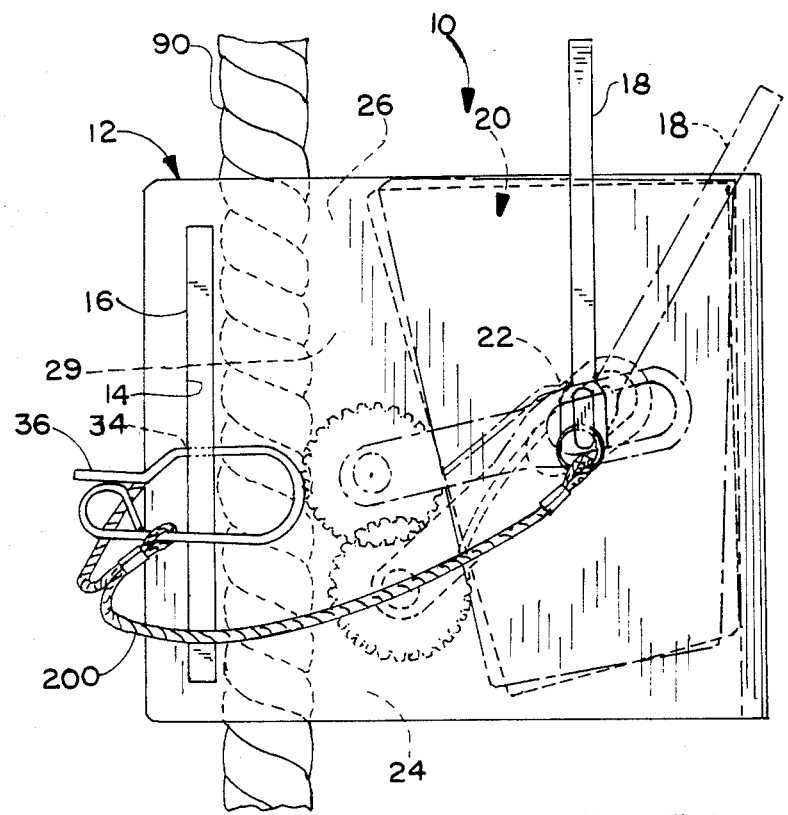
FIG. 1 is a side plan view of the inventive grip.

Referring to FIG. 1 the inventive rope grip 10 comprises generally a shell 12, with slots 14 and a removeable plate 16, an operating arm 18, and internal parts 20. Each of these features will be described in detail below.

The shell, in accordance with the present invention has a first engagement means in the form of slots 14 for securing the removeable plate 16, a second engagement means in the form of holes 22 for securing the internal parts 20. The shell surrounds an entrance area 24 and an exit area 26 with the volume between these areas defining a channel 29.

Referring to FIG. 2, plate 16 has two holes 34 to help secure the plate. The length 35 of plate 16 is greater than the thickness 37 of the shell shown in FIG. 3. The friction surface 28 of the plate may also be provided with fine grooves. These grooves serve a dual purpose; they improve the frictional properties of the plate surface as well as indicate wear.

Figure 3:
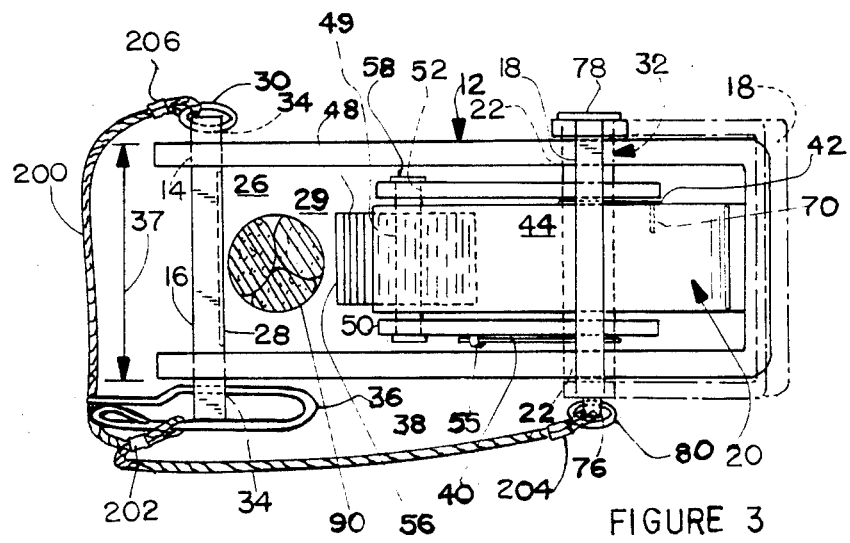
FIG. 3 is a top plan view of the inventive grip.

The length of the plate 35 is such that holes 34 may be disposed on opposite sides of the shell 12 shown in FIG. 3 when the plate is placed through the slots 14 shown in FIGS. 1 and 3. As shown in FIGS. 1 and 3 the plate is secured in position by placing a securing pin 36 through a hole 34 and a ring 30 through the other hole 34. That is, the ring restricts the motion of the plate in one direction, while the securing pin restricts motion in the opposite direction.

FIG. 3 is a top view of the inventive rope grip. When the plate 16 of FIG. 2 is passed through the slots 14 and secured as noted above, the exit area 26 thus defined is shown in FIG. 3. As FIG. 3 indicates, when the plate is not disposed through slots 14 the channel 29 is no longer physically defined as a closed channel. Therefore, it is not necessary to thread a rope through the inventive rope grip, it may be placed over a rope anywhere along the length of a rope before plate 16 is secured in position about the rope. In a like manner the inventive rope grip can be conveniently removed from a rope. This is one advantage of the inventive rope grip.

Referring to FIG. 4, the preferred embodiment of the inventive rope grip with internal parts including a restricting means assembly 38, and biasing means in the form of a first internal spring 40 and a second internal spring 42 is illustrated. Also illustrated is a wedge 44.

The restricting means assembly 38 includes a restricting means in the form of a cylinder 48 with a hole 49 along its axis, grooves 56 to indicate wear, and two support or guide plates 50 and 51 with holes 52 and elongated slots 54. See FIG. 5. One of the guide plates 50 has a spring holder 55. The restricting means assembly includes a mounting pin 58 for the cylinder.

Referring to FIG. 5, the wedge 44 has a larger dimension 60 and a smaller dimension 62. The wedge also has a friction surface 66 and holes 68 and 70. The friction surface 66 of the wedge 44, as well as the cylinder 48, may be grooved to change frictional properties as well as indicate wear.

Referring to FIG. 6, the pivot pin 32 is essentially cylindrical and has mechanical engagement means in the form of a hole 76, a groove 74 along its length, a tapered non-cylindrical end 72, and a shoulder 78.

The preferred embodiment of the inventive rope grip consists of the parts described above. The parts are arranged substantially as illustrated in FIGS. 1 through 6 and as further detailed below.

Referring to FIG. 4, the cylinder 48 is disposed about the mounting pin 58 in such a manner as to allow the cylinder to rotate about its axis. In the preferred embodiment this is accomplished by using a mounting pin 58 of diameter smaller than that of the hole 49 in cylinder 48. The mounting pin passes through the holes 52 in the guide plates 50 and 51 so as to dispose the cylinder securely between the guide plates. This result can be attained by using a rivet as a mounting pin 58 as shown.

As indicated by FIG. 4, guide plates 50 and 51 and wedge 44 are mounted on the pivot pin 32. Wedge 44 and the guide plates are free to rotate about pivot pin 32. This result is achieved as a result of hole 68 and the slots 54 being of larger dimension than the diameter of the pivot pin 32. It will be noted that the rotation of wedge 44 about pin 32 is limited by shell 12.

Referring to FIG. 5, the elongated slots 54 in the guide plates serve an important function. Because of slots 54, the cylinder 48 has a variable axis of rotation about pivot pin 32. Slots 54 are of such dimension so as to allow cylinder 48 to remain in contact with the wedge 44 throughout a wide angle of its rotation about the pivot pin 32.

FIG. 7 illustrates how the spring 40 is mechanically engaged to pivot pin 32. The spring is bent to the shape shown and placed in communication with the pivot pin 32 in the groove 74. The other end of the spring 40 is engaged to the guide plate by means of a spring holder 55, as shown in FIG. 4. Similar mechanical engagement is used to connect spring 42 to the pivot pin 32 and wedge 44 via a hole 70, as shown in FIG. 4.

The functional assembly 79 shown in FIG. 4 is disposed within shell 12, as FIGS. 1 and 3 illustrate. The operating arm 18 is disposed about the pivot pin 32 so that the operating arm 18 and pivot pin 32 are in a fixed position with respect to one another. The operating arm 18 has a hole mated to the non-cylindrical end 72 of the pivot pin 32 as shown in FIG. 1, accomplishing this result. The components are securely held in place by means of a securing ring 80 passing through hole 76 in the pivot pin 32, as FIG. 3 illustrates.

Referring to FIG. 4, springs 40 and 42 are connected to the pivot pin as well as the guide plate 50 and wedge 44. The springs are tensioned in such a manner so that when the operating arm 18 is in the vertical position, as in FIG. 1, the cylinder is biased downward towards entrance area 24, while wedge 44 is biased towards exit area 26, as shown in FIG. 1.

The inventive rope grip configured as described above offers many advantages. A rope 90 need not be threaded through the rope grip, the rope grip can be secured anywhere along a rope by removing and replacing plate 16 in FIG. 1, surrounding the rope in channel 29. This makes the rope grip convenient to use, and offers additional advantages. This feature allows the rope grip to be a personalized piece of equipment, a worker can carry the grip with him so that it is ready to use when the occasion arises. A personalized piece of equipment such as this can be properly maintained by the individual, for example it can be opened for cleaning. The fact that the rope grip can be opened offers the advantage that it can be removed from the rope when a knot or splice is encountered, and re-attached as the situation requires.

A cable 200, is threaded through ring 80 and held in place by a clamp 204. The cable is also threaded through pin 36 and ring 30, being fixedly connected by means of clamps 202 and 206, respectively. When a user removes pin 36 and plate 16 in order to take the inventive rope grip off of a rope, there is thus little danger of losing an important part.

The inventive rope grip is described above need not be activated by the operating arm and hence offers a high degree of fail safe operation. Although other configurations are possible, the use of a flat plate 16, an internal wedge 44 and a cylinder 48 as shown in FIG. 1 is advantageous. For intances, in the event of a fall, a rope will move rapidly through the rope grip towards the exit area 26. The friction of the rope intermittently hitting the cylinder 48 will tend to draw the cylinder upwards towards exit area 26, further restricting the channel and jamming the rope. Although other means might accomplish a similar result, the cylinder as disposed and described in the instant invention, is free to rotate about its own axis and remain in contact with surface 66. Therefore, as an upward force is exerted on one side of the cylinder, the cylinder will also rotate about its axis and walk itself along surface 66, providing a more reliable friction jamming mechanism.

Apart from having the convenience features and superior safety qualities, the inventive rope grip described above maintains its versatility. The surface of the flat plate 16, the wedge 44, and the axis of the cylinder 48 shown in FIG. 1 are all substantially parallel. This allows the inventive rope grip to be used with a substantial range of rope sizes, since the gripping of the rope takes place between two parallel surfaces which will equally distribute the gripping force over the rope's surface.

The preferred embodiment is described above and shown in FIG. 1 with operating arm 18 in a fixed position relative to the pivot pin 32. Cylinder 48 is also free to rotate about the pin 32. Through the use of springs, cylinder 48 is biased downwards, towards entrance area 24, while operating arm 18 is in upward position as shown. The cylinder 48 is biased away from the area 26 of the channel which has a smaller cross section, thus preventing unwanted jamming.

As described more fully below, applying an upward tension to operating arm 18 sufficient to support the weight of the rope grip, the cylinder 48 will be held away from rope 90. This allows a person to climb or descent relative to rope 90 without having to keep a hand on the rope grip.

The direct spring engagements to pivot pin 32 and cylinder 48 as shown in FIG. 4 cause the cylinder to be biased upwards when the operating arm is moved downwards, to the position shown by the phantom lines in FIG. 1 which it might assume if a man attached by a belt to the operating arm began to fall. This restricts the channel and causes the rope to quickly jam, when desired, by simply moving the operating arm downwards. It is noted that the force on the operating arm will work in conjunction with the force on the wedge during a fall impact because the operating arm would be ordinarily attached to a falling person and pulled downwards.

Spring 42 is dimensioned, configured and engaged in such a manner so that whenever tension is removed from the operating arm, said arm is biased downwards, as shown in FIG. 1. This has the effect of biasing cylinder 44 upwards and jamming the rope, as noted in the preceeding paragraph. This feature is particularly useful in the event of a fall, since the device would naturally tend to jam on the rope in the absence of any external forces on the operating arm, as when the user is falling with a downward velocity equal to that of the rope grip, or when the user is holding the body of the rope grip in a manner that removes tension from the operating arm.

While it is useful in the present invention to bias internal parts by way of the operating arm to prevent unwanted jamming or increase the speed and reliability of rope jamming when it is desired, it is also desirable not to rigidly fix the position of the internal parts relative to the operating arm. In the event of a fall if a user's body maintained the operating arm of the present invention upward as described and configured in the preferred embodiment, the device would operate in a fail safe fashion regardless of the position of the operating arm since the cylinder 48 is free to rotate about the pivot pin 32 shown in FIG. 4.

The preferred embodiment has strength by virtue of the fact that the impact of a fall will be absorbed by simple massive pieces of material primarily the wedge 44, pin 32 and cylinder 48 shown in FIG. 4 and shell 12 and operating arm 18 shown in FIG. 1. The variable axis of rotation of the cylinder 48 about the pivot pin 32 shown in FIG. 4, the position and dimensions of wedge 44, and guide plates 50 and 51 allow cylinder 48, wedge 44 and shell 12 to remain in contact during impact. This feature minimizes stresses on linkage parts, such as guide plates 50 and 51, and pin 32.

Figure 8:
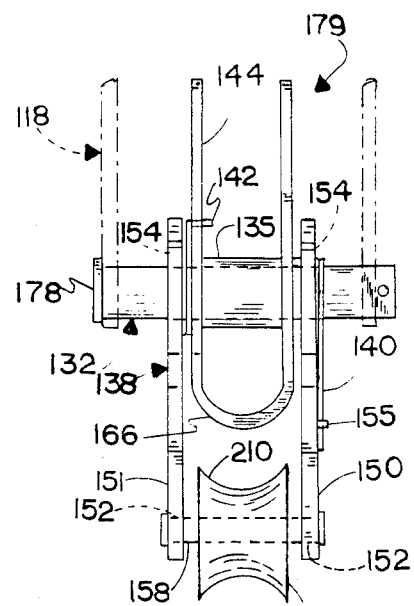
FIG. 8 is a detail of alternate internal parts of the inventive grip.

There are of course alternate modes of constructing the rope grip when particular advantages are sought. An alternate functional assembly 179 of the inventive rope grip is shown in FIG. 8. Assembly 179 shown in FIG. 8 is similar to assembly 79 shown in FIG. 4. The various elements are numerated 100 higher for purposes of brevity.

A wedge 144 is formed from a single piece of metal by bending it into a U shape in such a manner that surface 166 mates the surface of quasi-cylinder 148. Cylinder 148 is constructed in such a manner so that it has a concave surface that is, its radius at the midpoint of its axis is smaller than its radii at the end points of its axis.

Wedge 144, guide plate 150 and guide plate 151 are disposed about a bushing 135, which has two holes through which springs 142 and 140 can pass to engage a slot similar to slot 74 shown in FIG. 6, and described earlier. Functional assembly 179 is held in place by means of a shoulder 178 and a locking ring on pin 132. In other respects this embodiment is substantially the same as that described above, however here there are certain advantages over the embodiment first described above.

In particular, using functional assembly 179 allows the producer to assemble the internal parts almost completely before positioning them inside the housing of the rope grip, for instance in guide plates, springs and wedge are disposed about bushing 135 before they are placed inside the housing. At this time, pin 32 may be passed through the bushing engaging the springs, and fixing the entire assembly in place. This eliminates the awkward manufacturing step of trying to engage the springs to the slot in pin 32 by other means.

Moreover, the concave shape of cylinder 148 will provide exellent contacting with a rope, since its shape more closely approximates a rope's surface. The spaced facing relationship of the cylinder with the wedge surface 166 is preserved, because surface 210, like the rope, has a concave surface adapted to fit about the rope.

While illustrative embodiments of the invention have been described, various modifications will be obvious to those skilled in the art. For example, the operating arm 18 could be designed to fit a particular safety harness, or the cylinder 48 could be replaced by a cylinder with a rougher surface. Such modifications are within the spirit and scope of the invention which is limited and defined only by the appended claims.

I claim:
1. A rope grip comprising:
   (a) guide means defining a first gripping surface;
   (b) operator means defining a second gripping surface having upper and lower extremities, said first and second gripping surfaces defining a channel for receiving a rope;
   (c) first support means for pivotally supporting said operator means with said second gripping surface in facing spaced relationship to said first gripping surface, said lower extremity being positioned at a point further from said first gripping surface than said upper extremity;
   (d) restricting structure;
   (e) second support means for pivotally engaging said restricting structure between said first and second gripping surfaces at a variable distance from the pivot point; and
   (f) securing means for securing the rope grip to an operator mechanically coupled to said restricting structure, said securing means being positioned and configured to urge said restricting structure toward said upper extremity in response to downward motion of said securing means.

2. A rope grip as in claim 1, wherein said securing means is springedly secured to said restricting structure.

3. A rope grip as in claim 1, wherein said second support means comprises an arm means, said arm means incorporating an elongated slot mounted on a pin to allow said arm means to rotate about a plurality of points at a plurality of distances from said pin.

4. A rope grip as in claim 3, wherein said operator means comprises a wedge; said guide means comprises a gripping member and a housing; said first support means comprises a pin mounted on said housing and said wedge is rotatably mounted in said housing and is springedly coupled to said securing means to increase the space between said upper extremity and said first gripping surface when said securing means is urged downwards in response to the movement of said user.

5. A rope grip as in claim 2, wherein said operator means comprises a wedge; said guide means comprises a gripping member and housing; said first support means comprises a pin mounted on said housing and said wedge is rotatably mounted in said housing and is springedly coupled to said securing means to increase the space between said upper extremity and said first gripping surface when said securing means is urged downwards in response to the movement of said user.

6. A rope grip as in claim 1, wherein said securing means is configured and springedly positioned relative to said restricting structure so as to move downwards upon removal of an upward tension on said securing means whereby said restricting structure are urged toward said upper extremity.

7. A rope grip as in claim 6, wherein said securing means is springedly secured to said restricting structure.

8. A rope grip as in claim 7, wherein said second support means comprises an arm means, said arm means incorporating an elongated slot mounted on a pin to allow said arm means to rotate about a plurality of points.

9. A rope grip as in claim 8, wherein said operator means comprises a wedge, said guide means comprises a gripping member and a housing; said first support means comprises a pin mounted on said housing and said wedge is rotably mounted in said housing and is springedly coupled to said securing means downwards and to increase the space between said upper extremity and said first gripping surface when said securing means is urged downwards.

10. A rope grip as in claim 7, wherein said operator means comprises a wedge, said guide means comprises a gripping member and a housing; said first support means comprises a pin mounted on said housing and said wedge is rotably mounted in said housing and is springedly coupled to said securing means to urge said securing means downwards and to increase the space between said upper extremity and said first gripping surface when said securing means is urged downwards.

11. A rope grip as in claim 4, wherein said guide means is removable.

12. A rope grip as in claim 11, wherein said wedge comprises a convex surface and said restricting structure comprises a concave surface.

13. A rope grip as in claim 5, wherein said guide means is removable.

14. A rope grip as in claim 13, wherein said wedge comprises a convex surface and said restricting structure comprises a concave surface.

15. A rope grip as in claim 9, wherein said guide means is removable.

16. A rope grip as in claim 15, wherein said wedge comprises a convex surface and said restricting structure comprises a concave surface.

17. A rope grip as in claim 10, wherein said guide means is removeable.

18. A rope grip as in claim 17, wherein said wedge comprises a convex surface and said restricting structure comprises a concave surface.

19. A rope grip comprising: p1 (a) guide means defining a first gripping surface;
(b) operator means defining a second gripping surface having upper and lower extremities, said first and second gripping surfaces defining a channel for receiving a rope;
(c) first support means for pivotally supporting said operator means with said second gripping surface in facing spaced relationship to said first gripping surface, said lower extremity being positioned at a point further from said first gripping surface than said upper extremity;
(d) restricting structure;
(e) second support means for rotatably supporting said restricting structure at a variable distance between said first and second gripping surfaces; and
(f) securing means for securing the rope grip to an operator mechanically coupled to said restricting structure, said securing means being positioned and configured to urge said restricting structure toward said upper extremity in response to downward motion of said securing means.

* * * * *